Dec. 4, 1923.
E. H. HART
MOLDING
Filed Oct. 4, 1922
1,476,509
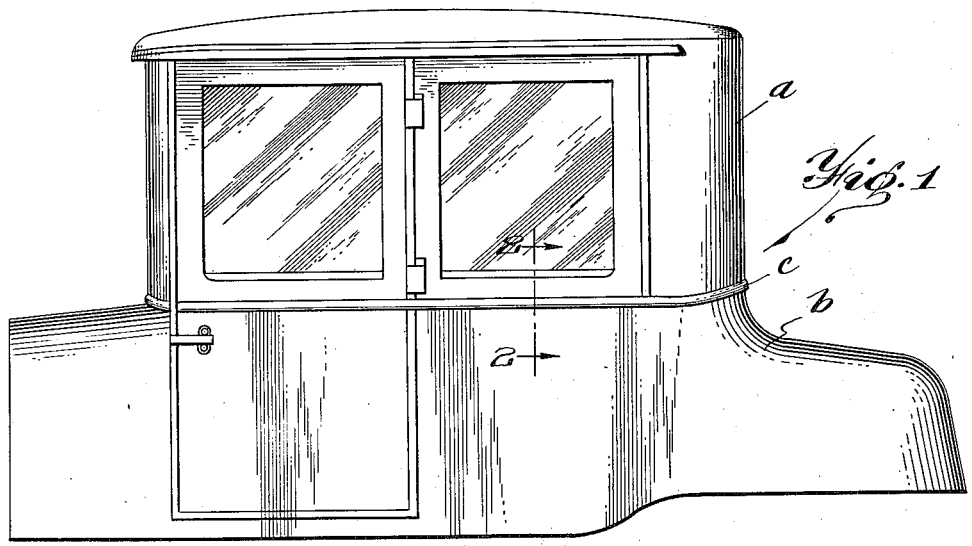
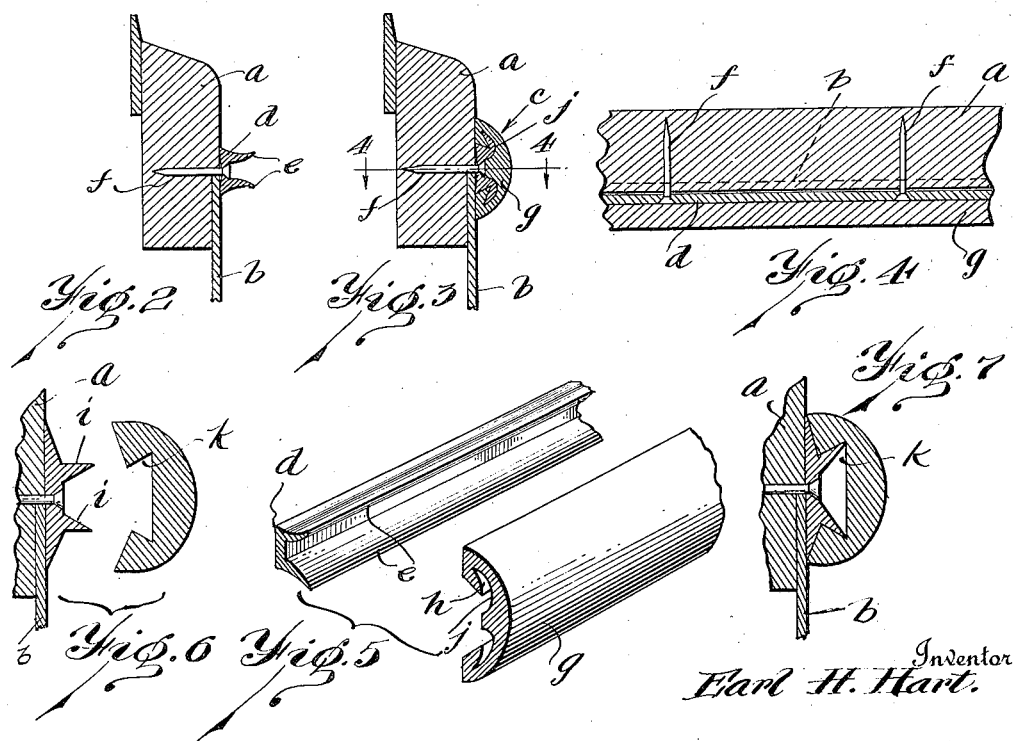
Inventor
Earl H. Hart.
By Stuart C. Barnes
Attorney Patented Dec. 4, 1923.

1,476,509

UNITED STATES PATENT OFFICE.

EARL H. HART, OF ROYAL OAK, MICHIGAN.

MOLDING.

Application filed October 4, 1922. Serial No. 592,230.

*To all whom it may concern:*

Be it known that EARL H. HART, a citizen of the United States, residing at Royal Oak, in the county of Oakland and State of Michigan, has invented certain new and useful Improvements in Moldings, of which the following is a specification.

This invention relates to molding and more particularly to one which is secured to a support and covering a joint in said support. The object is to provide means whereby the molding can be quickly and tightly secured in place. A further object is to provide a molding which is secured in place along its entire length in such a way that the nails for securing the molding to its support are concealed.

In the drawings:

Fig. 1 is a side elevation of an automobile body showing the molding applied thereto.

Fig. 2 is a vertical section showing the tenon strip applied to a support on the line 2—2 of Fig. 1.

Fig. 3 is similar to Fig. 2, but having the outer molding strip secured thereto.

Fig. 4 is a section on the line 4—4 of Fig. 3.

Fig. 5 is a detail perspective of the tenon strip and the molding strip before being secured together.

Fig. 6 is a view of a modified construction.

Fig. 7 is an assembled view of the modified construction.

The molding is shown applied to an automobile body, and this molding is commonly called a belt-molding. This form is used merely as an illustration of how the molding can be used, but it is obvious that this form of molding can be used on other than automobile bodies.

In Fig. 1 I have shown an enclosed automobile body which has the upper portion *a* separate from the lower portion *b* and the joint is covered by a molding *c*.

In Figures 2 and 3 I show the method by which the molding is secured to the support. A soft metal tenon strip *d* has the deformable ribs or tongues *e* running lengthwise of the strip. The tenon strip is here shown nailed to the support as at *f*, said nail being preferably located between the deformable ribs or tongues. A molding strip *g* has a groove *h* having a curved face *j* and is pressed or hammered onto the tenon strip. The ribs *e* are thus forced against the face *j* and into the grooves *h* thereby interlocking the molding strip with the tenon strip along the entire length.

In Figures 6 and 7, I have shown a modified construction in which the tenon strip has inverted V-shaped deformable ribs or tongues *i* and a molding strip provided with a groove *k*. In this construction the depth of the groove is less than the height of the tongue and when the molding strip is pressed or hammered onto the tenon strip, the ribs *i* are forced into the groove as shown in Fig. 7.

What I claim is:

1. In a structure as specified, the combination of a support, a long and narrow channel-like tenon strip arranged to lie with its back to the support and the up-standing walls forming deformable ribs, means passing through the back of the tenon strip for securing the same to the support, and a molding strip having under-cut recesses shaped to direct the deformable ribs into the under-cut portions when the molding strip is pressed on to the tenon strip whereby the two strips are locked together.

2. In a structure as specified, the combination of a support, a long narrow channel-like tenon strip arranged with the back of the channel to lie against the support and the up-standing walls of the channel forming deformable ribs, means driven through the tenon strip back for securing the same to the support and a molding strip having recesses of less depth than the ribs and provided with under-cut portions, said recesses being shaped so that when the molding strip is placed on the tenon strip the ribs being wider than the depth of recesses are turned into the under-cut portions to lock the molding strip to the tenon strip.

In testimony whereof I affix my signature.

EARL H. HART.